United States Patent [19]

Ishimaru

[11] Patent Number: 5,138,293

[45] Date of Patent: Aug. 11, 1992

[54] TERMINAL CONNECTION STRUCTURE OF ELECTROMAGNETIC COUPLING DEVICE

[75] Inventor: Takashi Ishimaru, Gunma, Japan

[73] Assignee: Ogura Clutch, Co., Ltd., Gunma, Japan

[21] Appl. No.: 757,166

[22] Filed: Sep. 10, 1991

[30] Foreign Application Priority Data

Sep. 17, 1990 [JP] Japan ................. 2-244075
Sep. 17, 1990 [JP] Japan ................. 2-244076

[51] Int. Cl.[5] .................. H01F 7/20; H01F 15/10
[52] U.S. Cl. .................. 335/289; 192/84 C; 336/192
[58] Field of Search .......... 335/209, 289; 336/192; 192/84 C

[56] References Cited

U.S. PATENT DOCUMENTS 4,432,446  2/1984  Okano et al. ................. 192/84

FOREIGN PATENT DOCUMENTS

| 57-100630 | 6/1982 | Japan . |
| 60-12732 | 1/1985 | Japan . |
| 63-12108 | 1/1988 | Japan . |
| 63-6512 | 2/1988 | Japan . |
| 1-168028 | 11/1989 | Japan . |
| 2-72821 | 6/1990 | Japan . |

Primary Examiner—Harold Broome
Attorney, Agent, or Firm—Townsend and Townsend

[57] ABSTRACT

A terminal connection structure of an electromagnetic coupling device includes terminal housing unit, an extraction hole, a flat contact portion, a conductive mount member, and a conductive support member connected to a power source lead line. The terminal housing unit is formed integrally with a resin coil bobbin having an electromagnetic coil therein, and projects from a through hole formed in a yoke having an annular groove in which the resin coil bobbin is press-fitted. The extraction hole is formed in the terminal housing unit to extract one end of a winding of the electrogmagnetic coil. The flat contact portion is formed between a pair of grooves formed on two sides thereof in the terminal housing unit, and one end of the winding extracted from the extraction hole is brought into contact with the flat contact portion. The conductive mount member is press-fitted in one groove of the terminal housing unit to hold a portion of the winding brought into contact with the flat contact portion. The conductive support member is press-fitted in the other groove of the terminal housing unit to hold another portion of the winding brought into contact with the flat contact portion, and abuts against the mount member to hold press-fit states of the both.

14 Claims, 7 Drawing Sheets

TERMINAL CONNECTION STRUCTURE OF ELECTROMAGNETIC COUPLING DEVICE

BACKGROUND OF THE INVENTION

The present invention relates to a terminal connection structure of an electromagnetic coupling device used as an electromagnetic clutch for transmitting a rotational torque or an electromagnetic brake for braking a rotational torque.

Generally, in a friction electromagnetic coupling device such as an electromagnetic clutch, a magnetic flux generated by exciting an electromagnetic coil is flowed between a rotor and an armature arranged such that their friction surfaces oppose each other, and the friction surfaces are brought into contact with or separated from each other by a magnetic attraction force of the magnetic flux and a spring force against the magnetic attraction force, thereby transmitting or interrupting a rotational torque.

Of the electromagnetic coupling devices of this type, an electromagnetic clutch mounted on, e.g., an automobile refrigerant compressor has a predetermined lead wire length corresponding to the type of an automobile. Therefore, a certain type of a yoke incorporating an electromagnetic coil cannot be used in various types of automobiles to result in poor economy in design or inventory control. For this reason, there is a proposal of changing the design of a conventional structure, in which a winding of an electromagnetic coil and a lead wire are connected in a yoke, such that the winding of an electromagnetic coil and the lead wire are connected outside the yoke, as disclosed in, e.g., Japanese Patent Laid-Open No. 63-12108.

In this electromagnetic clutch, a pair of support metal members are formed integrally with one side wall of a coil bobbin and inserted together with a metal member support portion of the coil bobbin into a through hole of the yoke to project outside the yoke. The start and terminal end portions of a winding of an electromagnetic coil wound on the coil bobbin are extracted from extraction holes of the coil bobbin and fitted in guide grooves of the support metal members. Therefore, the start and terminal end portions of the winding of the electromagnetic coil are fixed to be aligned in the radial direction.

A pair of mount metal members mounted on a fixing member and fixing a lead wire have projecting portions inserted in a pair of metal member holding grooves formed in the support metal members. The start and terminal end portions of the winding of the electromagnetic coil aligned in the axial direction by the support metal members are inserted in caulking portions of the mount metal members and caulked therein. A fitting groove of the fixing member is fitted on a locking piece of a mount plate of the yoke. The caulking portions of the mount metal members in which the start and terminal end portions of the winding of the electromagnetic coil are inserted are caulked. The caulked portions are welded by fusing the electromagnetic coil as an enameled wire, and the welded portions have a cover fixed on the yoke by an adhesive.

However, in the above connection structure of a winding of an electromagnetic coil and a lead wire which are formed in the conventional electromagnetic clutch, the start and terminal end portions of the winding of the electromagnetic coil are extracted outside a coil bobbin and aligned in the radial direction to axially project, and these projecting end portions are covered and caulked with the caulking portions of the mount metal members, resulting in poor workability. In addition, in such caulking, the start and terminal end portions of the winding of the electromagnetic coil may be loosened in the caulking portions of the mount metal members due to poor caulking. Therefore, in order to eliminate this drawback, so-called soldering for fusing and fixing the coil end portions must be performed to pose a problem in productivity.

Furthermore, since a surge voltage absorbing member is exposed outside the structure, the member must be covered with an insulating tube such as a heat-shrinkable tube, resulting in high manufacturing cost.

SUMMARY OF THE INVENTION

It is an object of the present invention to provide a terminal connection structure of an electromagnetic coupling device, which facilitates connection between a winding of an electromagnetic coil and a lead wire.

It is another object of the present invention to provide a terminal connection structure of an electromagnetic coupling device, which can reduce labors by improving workability.

It is still another object of the present invention to provide a terminal connection structure of an electromagnetic coupling device, which can realize low cost by improving productivity.

It is still another object of the present invention to provide a terminal connection structure of an electromagnetic coupling device, which can decrease the size of the device as a whole by employing a low-profile connection portion of a winding of an electromagnetic coil and a lead wire.

It is still another object of the present invention to provide a terminal connection structure of an electromagnetic coupling device, in which a surge voltage absorbing member such as a diode can be arranged at low cost.

In order to achieve the above objects of the present invention, there is provided a terminal connection structure of an electromagnetic coupling device, comprising a terminal housing unit formed integrally with a resin coil bobbin having an electromagnetic coil therein, and projecting from a through hole formed in a yoke having an annular groove in which the resin coil bobbin is press-fitted, an extraction hole formed in the terminal housing unit to extract one end of a winding of the electromagnetic coil, a flat contact portion formed between a pair of grooves formed on two sides thereof in the terminal housing unit, one end of the winding extracted from the extraction hole being brought into contact with the flat contact portion, a conductive mount member press-fitted in one groove of the terminal housing unit to hold a portion of the winding brought into contact with the flat contact portion, and a conductive support member connected to a power source lead wire, the conductive support member being press-fitted in the other groove of the terminal housing unit to hold another portion of the winding brought into contact with the flat contact portion, and abutting against the mount member to hold press-fit states of both the conductive mount member and the conductive support member.

BRIEF DESCRIPTION OF THE DRAWINGS

FIGS. 1 to 6 show an embodiment in which an electromagnetic coupling device according to the present invention is applied to an electromagnetic clutch of an automobile refrigerant compressor, in which

FIGS. 7 and 8 show another embodiment of the present invention, in which electromagnetic clutch in correspondence with FIG. 3, FIGS. 9 and 10 show still another embodiment of the present invention, in which

DETAILED DESCRIPTION OF THE PREFERRED EMBODIMENTS

Figure 1:
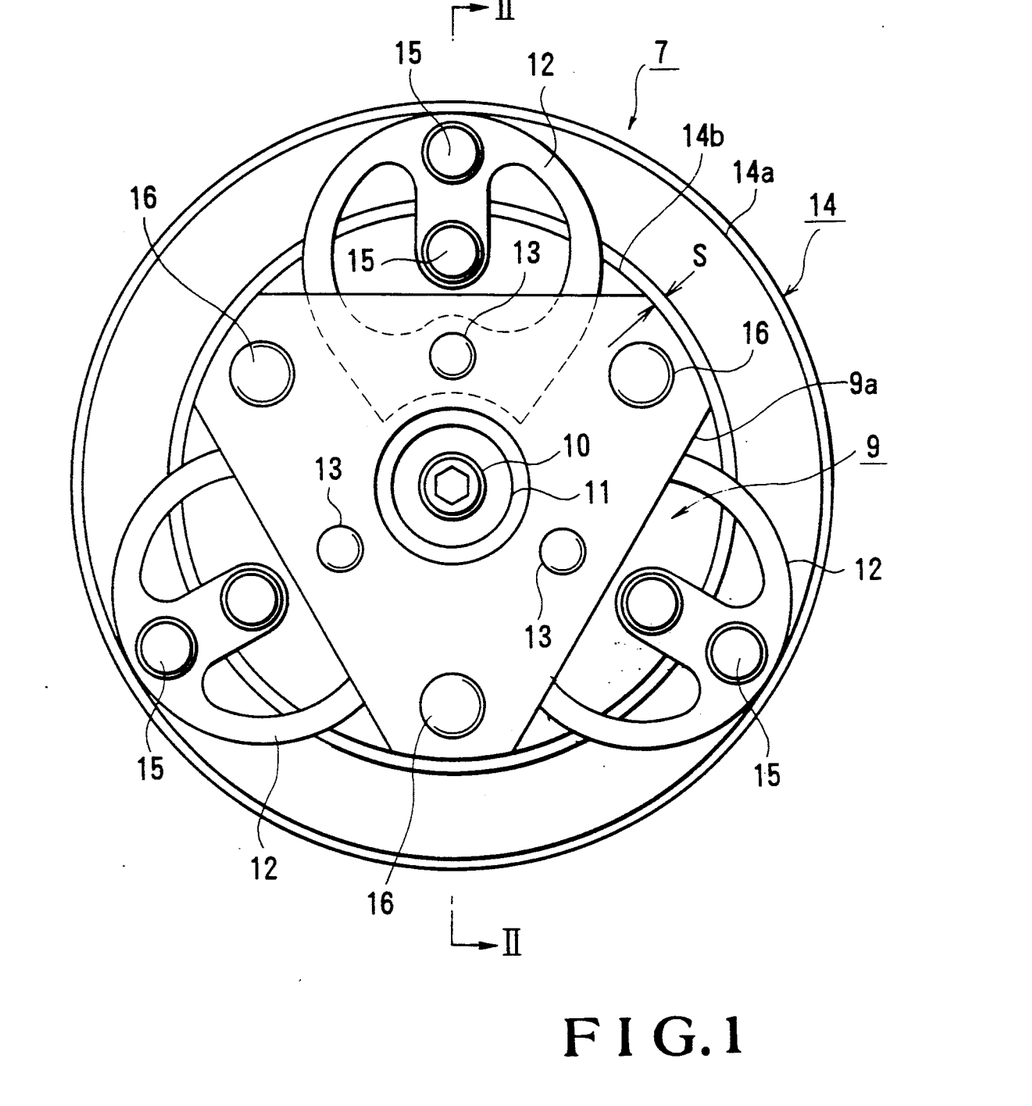
FIG. 1 is a front view showing the electromagnetic clutch.
Figure 2:
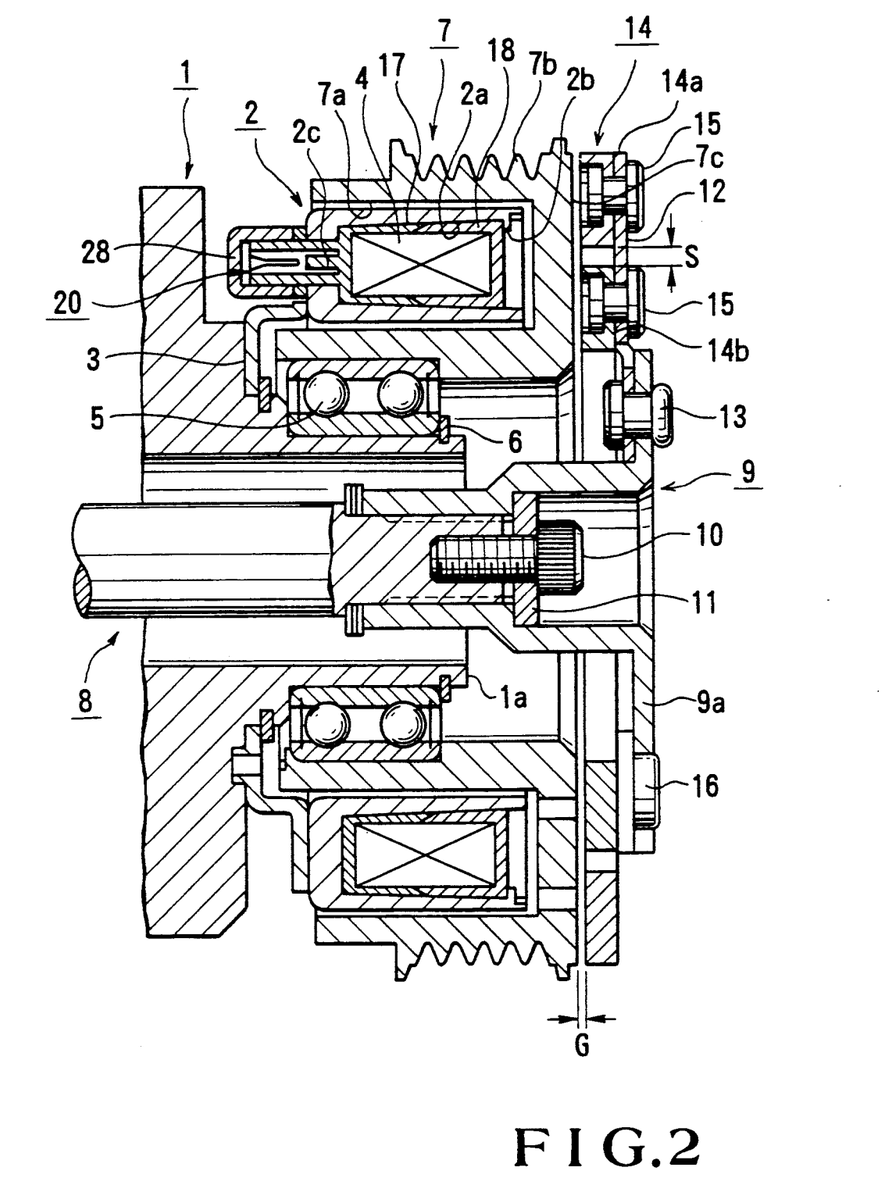
FIG. 2 is a sectional view taken along a line II—II of FIG. 1, from which a terminal housing unit is omitted.
Figure 3:
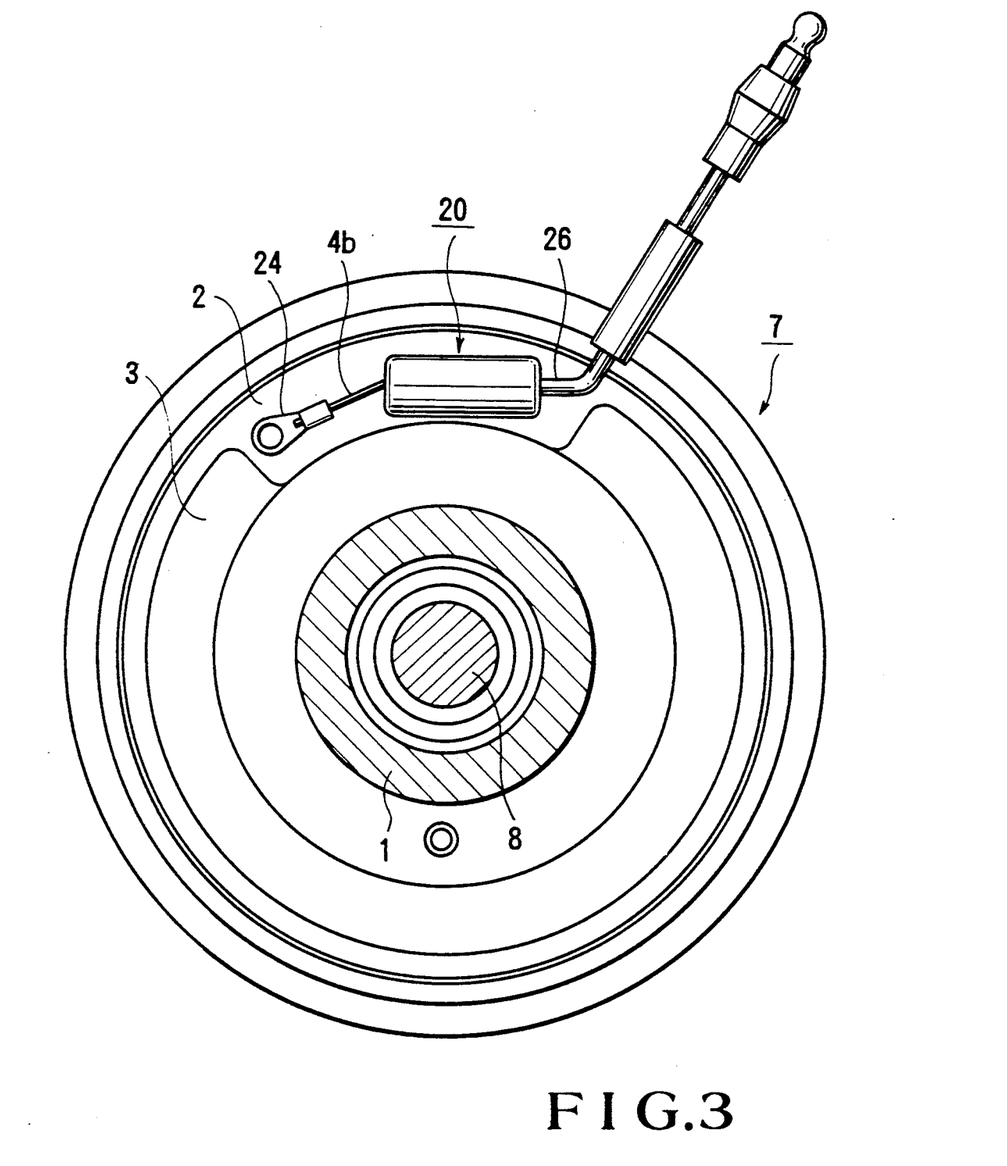
FIG. 3 is a rear view showing the electromagnetic clutch.
Figure 4:
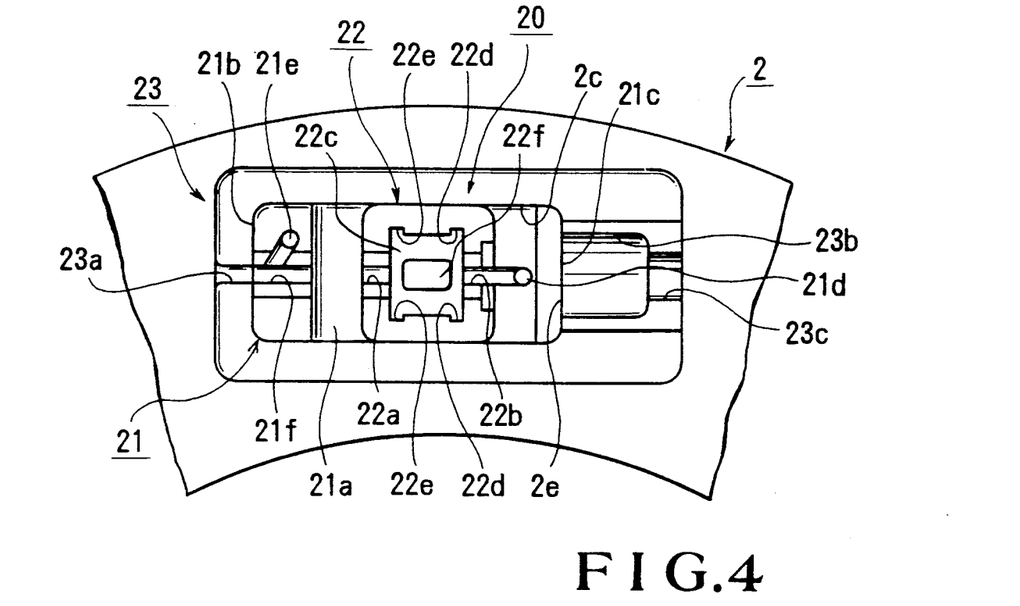
FIG. 4 is an enlarged sectional view showing the terminal housing unit in which a spacer is press-fitted in a bobbin projecting from the rear surface of a yoke.
Figure 5:
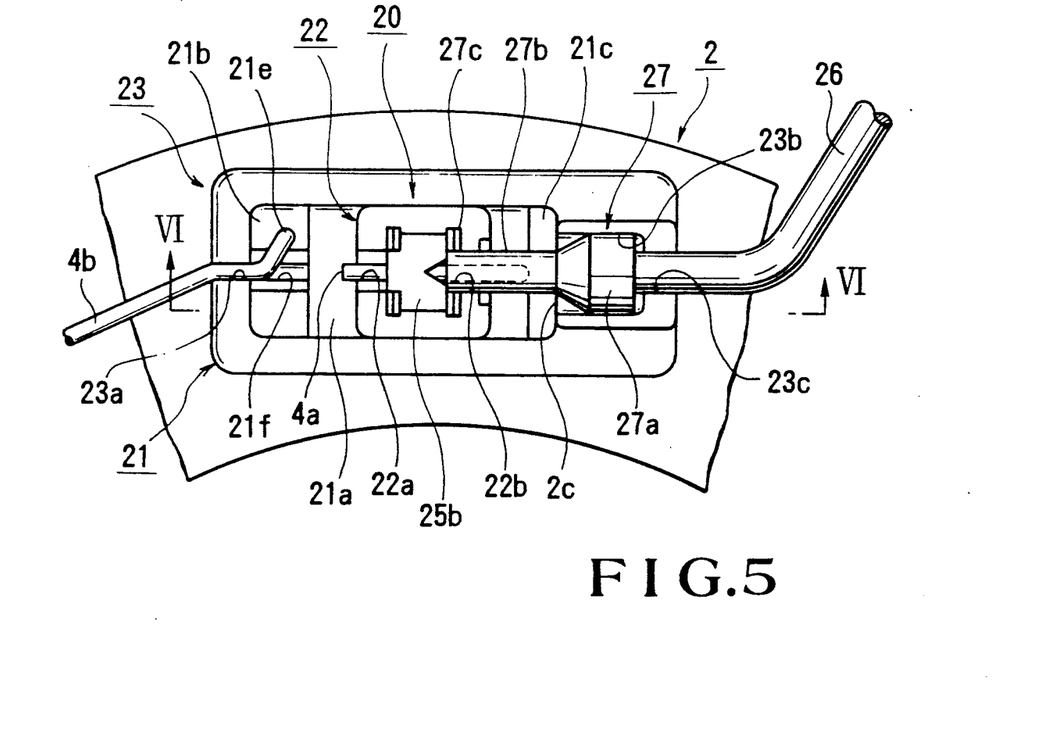
FIG. 5 is an enlarged sectional view showing the terminal housing unit in which winding start and terminal end portions of an electromagnetic coil are extracted from the state shown in FIG. 4 and a support metal member and a mount metal member are assembled.
Figure 6:
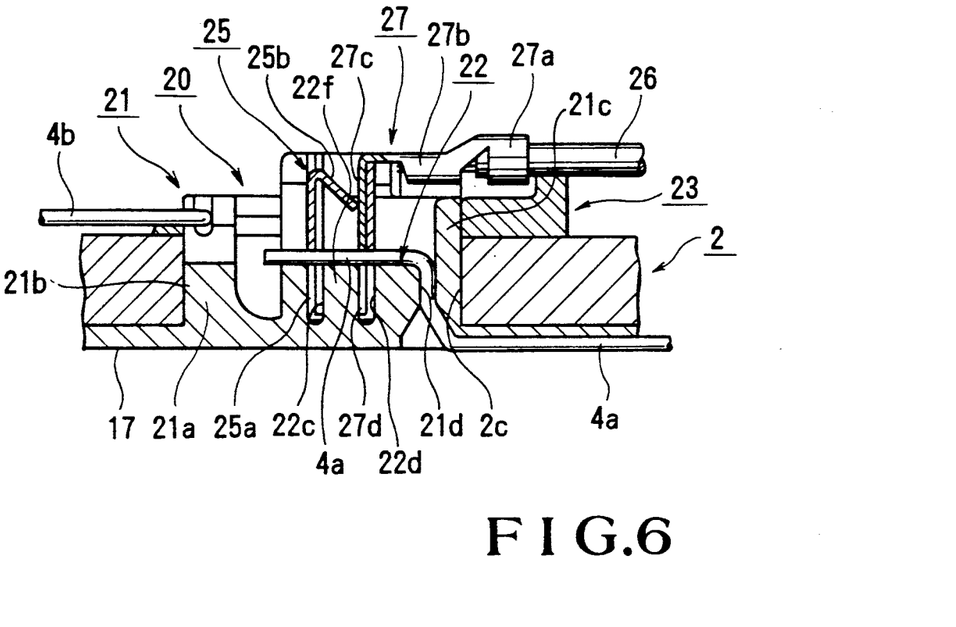
FIG. 6 is a cross-sectional view taken along a line VI—VI of FIG. 5.

FIGS. 1 to 6 show an embodiment in which an electromagnetic coupling device according to the present invention is applied to an electromagnetic clutch of an automobile refrigerant compressor. FIG. 1 shows the front portion of the electromagnetic clutch, and FIG. 2 shows the section of the electromagnetic clutch taken along a line II - II of FIG. 1, from which a terminal housing unit is omitted. FIG. 3 shows the rear portion of the electromagnetic clutch, and FIG. 4 shows the terminal housing unit in an enlarged scale, in which a spacer is press-fitted in a bobbin projecting from the rear surface of a yoke. FIG. 5 shows the section of the terminal housing unit in an enlarged scale, in which the start and terminal end portions of a winding of an electromagnetic coil are extracted from the state shown in FIG. 4 and a support metal member and a mount metal member are assembled, and FIG. 6 shows the cross section of the terminal housing unit taken along a line VI—VI of FIG. 5. In these drawings, an annular yoke 2 having a U-shaped section is supported by a housing 1 of a compressor via a support plate 3, and an electromagnetic coil 4 fixed by a structure to be described later is housed in an annular groove 2a of the yoke 2. A bearing is fitted in a nose portion 1a of the housing 1 and fixed in the axial direction by a snap ring 6 and a step portion of the housing 1. An annular rotor 7 having an annular groove 7a for receiving the yoke 2 is fixed in the rotational direction to the outer ring of the bearing 5 by press fitting or the like. The rotor 7 is fixed in the axial direction by the step portion and a caulking piece. A plurality of V-grooves 7b are formed in the outer circumferential portion. The rotor 7 is rotated from a driving side by a V-belt looped between the V-grooves 7b and a driving source such as an automobile engine.

An armature hub 9 with a boss having a substantially triangular flange 9a is serration-fitted on the distal end portion of a rotating shaft 8 axially supported by a bearing (not shown) on the housing 1 side through a central hole of the housing 1. The armature hub 9 is fixed by a bolt 10 and a washer 11. A plurality of leaf springs 12 each constituted by a substantially heart-like plate are respectively fixed to central portions of sides of the triangular flange 9a by rivets 13. Reference numeral 14 denotes an armature constituted by armature pieces 14a and 14b. The armature pieces 14a and 14b are formed into concentric rings and fixed at three equiangular positions in the circumferential direction to the leaf springs 12 by rivets 15 with an interval indicated by reference symbol S shown in FIG. 1 therebetween. The armature 14 has a surface opposite to a magnetic attraction surface 7c of the rotor 7 and is biased by the leaf springs 12 to slightly move away from the friction surface 7c of the rotor 7. When the electromagnetic coil 4 is not excited, the armature 14 is kept separated from the friction surface 7c by a distance indicated by reference symbol G by the biasing force of the leaf springs 12. When the electromagnetic coil 4 is excited, the armature 14 is magnetically attracted by the friction surface 7c against the biasing force of the leaf springs 12. Reference numerals 16 denote rubber stoppers for giving an initial recovering force to the leaf springs 12.

A fixing structure of the electromagnetic coil 4 and its connection structure with a lead wire will be described below. That is, the first half in the axial direction of the annular electromagnetic coil 4 is inserted in an annular coil bobbin 17 having a U-shaped section. The second half of the electromagnetic coil 4 exposed from the coil bobbin 17 is covered with an annular coil cover 18 having a U-shaped section. The distal ends of the coil bobbin 17 and the coil cover 18 join each other. The outer surfaces of the coil bobbin 17 and the coil cover 18 and the inner surface 2a of the yoke 2 in which the coil bobbin 17 and the coil cover 18 are fitted are tapered. Therefore, the coil bobbin 17 and the coil cover 18 are press-fitted in the yoke 2 from the opening end of the yoke 2 and strongly fixed in it, and the electromagnetic coil 4 is shielded from the outside. A plurality of caulking portions 2b formed by pressing the opening end portion of the yoke 2 are aligned in the circumferential direction of the opening end portion. By caulking the caulking portions by elastic deformation, removal of the coil bobbin 17 and the coil cover 18 is prevented. Note that the distal end portion of the coil bobbin 17 and the distal end portion of the coil cover 18, which constitute the joint portion described above, are formed to be inclined in opposite directions. Therefore, the inclined surfaces of these end portions join each other by a wedge effect upon caulking of the caulking portions 2b to further strengthen fixing of the electromagnetic coil 4, and the electromagnetic coil 4 is perfectly shielded from the outside.

A longitudinal hole 2c is formed through a bottom plate of the yoke 2 at one portion in the circumferential direction of the yoke 2 in which the coil bobbin 17 is press-fitted as described above. A terminal housing unit formed integrally with the coil bobbin 17 and generally denoted by reference numeral 20 projects outside the yoke 2 from the hole 2c. The terminal housing unit 20 has a U-shaped terminal press-fitting portion 21 constituted by a side plate 21a and support plates 21b and 21c projecting from the two ends of the side plate 21a toward a side opposite to the electromagnetic coil 4 side along the short sides of the hole 2c. A projecting portion 22 having a substantially square side sectional shape is formed integrally with a central portion of the side plate 21a to project sideways. Reference numeral 23 denotes a resin spacer formed into a rectangular frame with a step so that its inner circumferential surface is fitted on the terminal press-fitting portion 21. A groove 23a, a recess portion 23b, and a groove 23c are formed in the side end face of the spacer 23. Grooves 22a and 22b are formed in the side end face of the projecting portion 22 to concentrically correspond to the groove 23a, the recess portion 23b, and the groove 23c. An extraction hole 21d for extracting one end of a winding of the electromagnetic coil 4, e.g., the start end portion of the winding is formed in the side plate 21a of the terminal press-fitting portion 21 along the support plate 21c and an extraction hole 21e for extracting the other end of the winding of the electromagnetic coil 4, e.g., the terminal end portion of the winding and a groove 21f are formed in the support plate 21b of the terminal press-fitting portion 21. Note that although the start end portion is extracted from the extraction hole 21d and the terminal end portion is extracted from the extraction hole 21e in this embodiment, the start end portion may be extracted from the extraction hole 21e while the terminal end portion is extracted from the extraction hole 21d. In this embodiment, the start end portion of the winding will be called "one end" of the electromagnetic coil, and the terminal end portion of the winding will be called "the other end" of the electromagnetic coil.

A part denoted by reference numeral 4a in FIG. 5 is one end of the electromagnetic coil 4 extracted from the extraction hole 21d. One end 4a of the electromagnetic coil 4 extracted from the extraction hole 21d and bent at a right angle extends along a central portion of the vertical surface of the projecting portion 22 while being engaged with the grooves 22b and 22a. The other end 4b of the electromagnetic coil 4 extracted from the extraction hole 21e extends in the circumferential direction of the yoke 2 while being engaged with the grooves 21f and 23a and a terminal 24 mounted on the distal end of the other end 4b is fixed on the side surface of the yoke 2. Note that grooves 22d and 22e and a projection 22f are formed in a substantially square recess portion 22c formed in a central portion of the projecting portion 22.

Reference numeral 25 denotes a mount metal member formed by a metal plate into an inverted V sectional shape having an elastic piece 25b, and engaged in the recess portion 25c. A substantially inverted U-shaped notched portion 25a is formed in the lower half portion of the mount metal member 25. The mount metal member 25 is engaged in the groove 22e and press-fitted in the recess portion 22c. of the projecting portion 22 while being in slide contact with the projection 22f. The notched portion 25a and the projection 22f sandwich one end 4a of the electromagnetic coil 4. Reference numeral 26 denotes a lead wire connected to a battery power source side. A support metal member 27 is fixed by caulking to the distal end portion of the lead wire 26. The support metal member 27 is integrally formed by a metal caulking portion 27a, an insulating caulking portion 27b, and a plate-like bent piece 27c bent at a right angle from the distal end of the insulating caulking portion 27b. The elastic piece 25b of the mount metal member 25 is elastically deformed by the bent piece 27c and press-fitted in the recess portion 22c. A substantially inverted U-shaped notched portion 27d formed at the distal end portion of the bent piece 27c holds one end 4a of the electromagnetic coil 4. The bent piece 27c is engaged with the groove 22d and press-fitted while being in slide contact with the projection 22f.

The terminal housing unit 20 having the above arrangement is covered with a resin cover 28 which is bonded integrally to the spacer 23 and the coil bobbin 17. Therefore, the interior of the cover 28 is shielded from the outside.

An operation of the electromagnetic clutch having the above arrangement will be described below. When the electromagnetic coil 4 is excited while the rotor 7 is driven from the motor side and rotated on the nose portion 1a of the housing 1, a magnetic flux circuit is formed from the yoke 2 to the armature 14 through the outer pole of the rotor 7 by an effect of a magnetic shielding portion, and then returned to the yoke 2 through the inner pole of the rotor 7. Therefore, the armature 14 is attracted to the rotor 7 against the biasing force of the leaf springs 12. As a result, the armature 14 is rotated integrally with the rotor 7, and the rotating shaft 8 formed integrally with the armature 14 is rotated to activate an air compressor.

When excitation of the electromagnetic coil 4 is released, the armature 14 is separated from the rotor 7 by the biasing force of the leaf springs 12, and transmission of the rotation is released to stop rotation of the rotating shaft 8.

In the electromagnetic clutch having the above arrangement, in order to assemble the electromagnetic coil 4 into the yoke 2, about the half of the electromagnetic coil 4, one end 4a and the other end 4b of which are extracted from the extraction holes 21d and 21e beforehand, is housed in the coil bobbin 17, and the coil cover 18 is press-fitted on the remaining half. Since the joint portions of the coil bobbin 17 and the coil cover 18 are formed to be inclined in opposite directions, the coil bobbin 17 and the coil cover 18 are strongly fixed to the electromagnetic coil 4. The coil bobbin 17 and the coil cover 18 assembled integrally with the electromagnetic coil 4 is inserted in the annular groove 2a of the yoke 2.

One end 4a of the electromagnetic coil 4 extracted from the extraction hole 21d is bent at a right angle and brought into contact with the flat surface of the projection 22f in the projecting portion 22 formed in the terminal housing unit 20 while being engaged with the grooves 22a and 22b. When the mount metal member 25 inserted in the recess portion 22c of the projection portion 22 is pushed to be engaged with the groove 22e of the projecting portion 22, the mount metal member 25 is press-fitted in the recess portion 22c while sandwiching the one end 4a of the electromagnetic coil 4 between the notched portion 25a and the projection 22f. The support metal member 27 is fixed by caulking to the distal end portion of the lead wire 26 on the power source side and engaged with the recess portion 23b and the groove 23c, and the bent piece 27c is pushed to be engaged with the groove 22d. As a result, the bent piece 27c is press-fitted while elastically deforming the elastic piece 25b of the mount metal member 25, and one end 4a of the electromagnetic coil 4 is sandwiched between the notched portion 27d and the projection 22f. Therefore, the mount metal member 25 and the bent piece 27c of the support metal member 27 are urged against the side walls of the recess portion 22c in the press-fit state, thereby further strengthening the press-fit state. The other end 4b of the electromagnetic coil 4 is extracted as an earth wire from the extraction hole 21e, and the terminal 24 at the distal end portion of the other end 4b is fixed to the side surface of the yoke.

The terminal housing unit 20 is covered with the cover 28 to hold the support metal fitting 27 by the recess portion 23b. and the groove 23c of the spacer 23 and the cover 28.

In this embodiment as described above, assembly is easily performed to improve productivity as compared with a conventional device in which a resin fixing member for holding a caulking portion of a support metal member in which a metal portion and an insulating portion of a lead wire are inserted is provided to be engaged with a groove of a mount plate.

Figure 7:
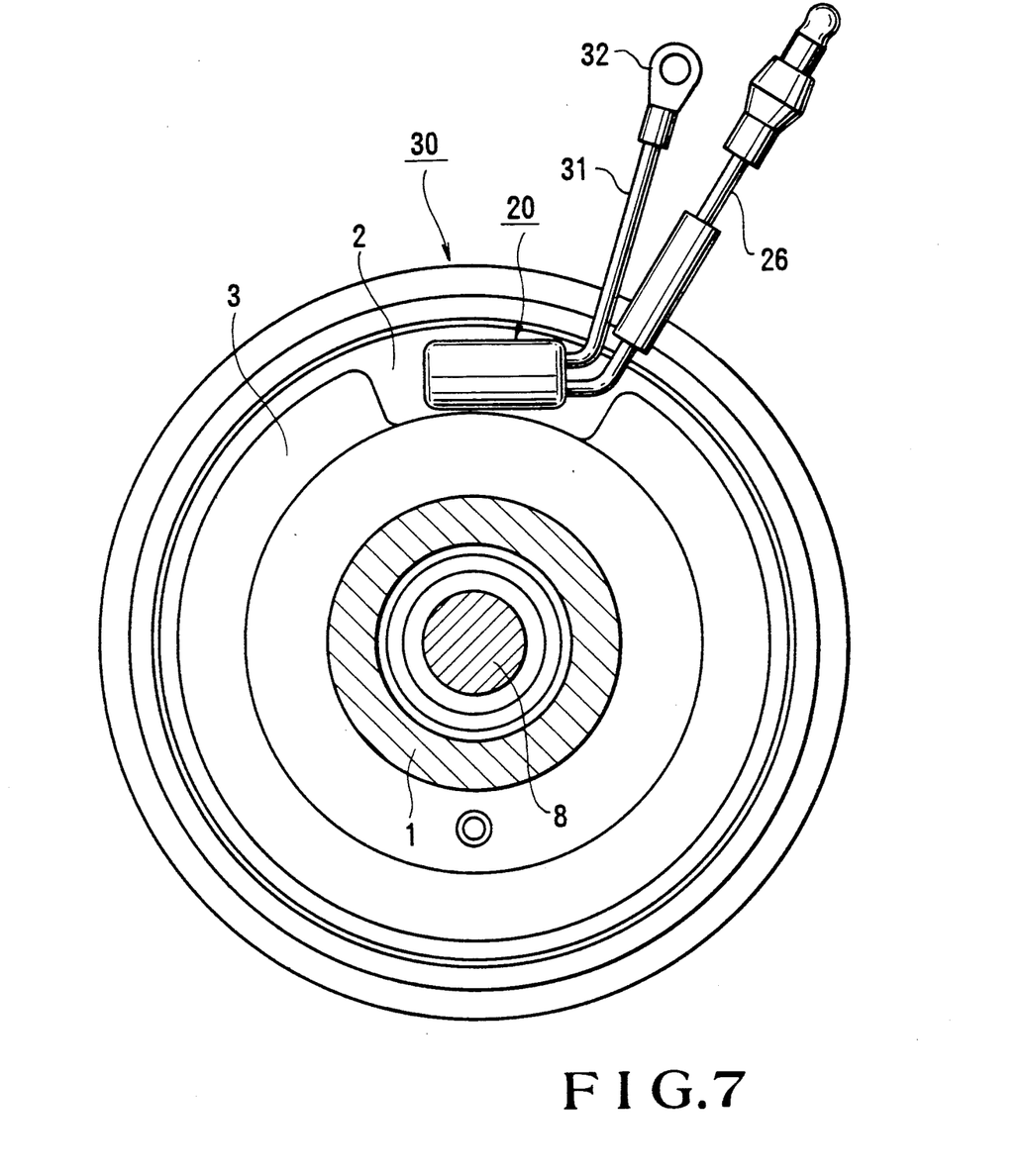
Figure 8:
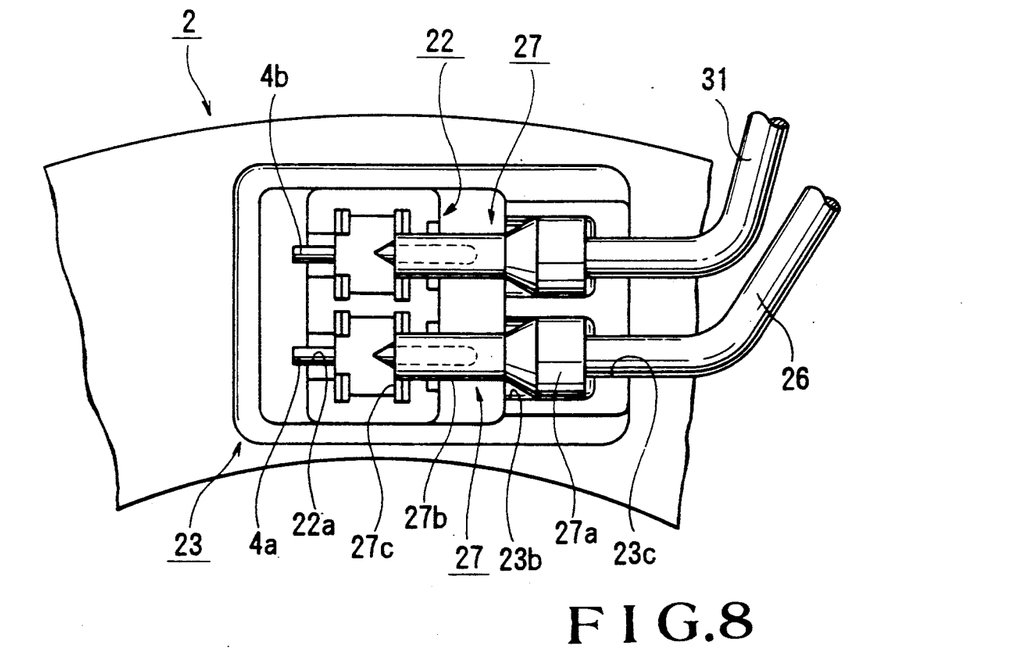
FIG. 8 is an enlarged sectional view showing a terminal housing unit in correspondence with FIG. 5.

FIGS. 7 and 8 show another embodiment of the present invention, in which FIG. 7 illustrates the rear portion of an electromagnetic clutch in correspondence with FIG. 3, and FIG. 8 illustrates a terminal housing unit in an enlarged scale in correspondence with FIG. 5. In the above embodiment, the other end 4b of the electromagnetic coil 4 as an earth wire extends to the side of the terminal housing unit 20 opposite to the lead wire 26, and its terminal 24 is fixed on the side surface of the yoke 2. In an electromagnetic clutch 30 of this embodiment, however, the other end of an electromagnetic coil extends in the same direction as a lead wire, as indicated by reference numeral 31, and a terminal 32 at its distal end portion is fixed to a frame of an automobile refrigerant compressor, a vehicle body, or the like. Other arrangements and effects of this embodiment are the same as those of the embodiment described above with reference to FIGS. 1 to 6.

In each of the above embodiments, the present invention is applied to an electromagnetic clutch. However, the present invention can be similarly applied to an electromagnetic brake in which an armature is magnetically attracted directly to a yoke, thereby obtaining similar effects. In addition, the structure except for the structure of connecting the electromagnetic coil 4 and the lead wire 26 is not limited to that in each of the above embodiments. For example, in an electromagnetic coupling device having a structure in which the yoke 2 is not entirely fitted in the annular groove 7a of the rotor 7, the terminal housing unit of the coil bobbin 17 of the coil bobbin 17 may project from the outer circumferential surface of the yoke 2, or the lead wire 26 and the end portions 4b and 31 of an electromagnetic coil on the earth side can be extracted in any direction.

Furthermore, in each of the above embodiments, the spacer 23 is provided in consideration of the size of the yoke 2. However, if a satisfactorily large width can be assured in a bottom portion of the yoke 2 in the radial direction, the coil bobbin 17 may be formed integrally with a portion corresponding to the spacer 23. Although the electromagnetic coil 4 is a heat-fusing electric wire in each of the above embodiment, it may be a conventional enameled wire. Moreover, the cover 28 need not be welded but can be bonded by an adhesive as in conventional structures.

As is apparent from the above description, according to the present invention, an electromagnetic coil can be fixed without being welded or soldered unlike in conventional structures. Therefore, the electromagnetic coil can be assembled easily within a short time period to lead to an improvement in productivity and a reduction in labors. In addition, as compared with a conventional structure in which respective metal fittings are assembled while the end portion of an electromagnetic coil is extracted in the axial direction, since a connection portion of an electromagnetic coil and a lead wire can have a low profile, a device itself can be made compact.

Figure 9:
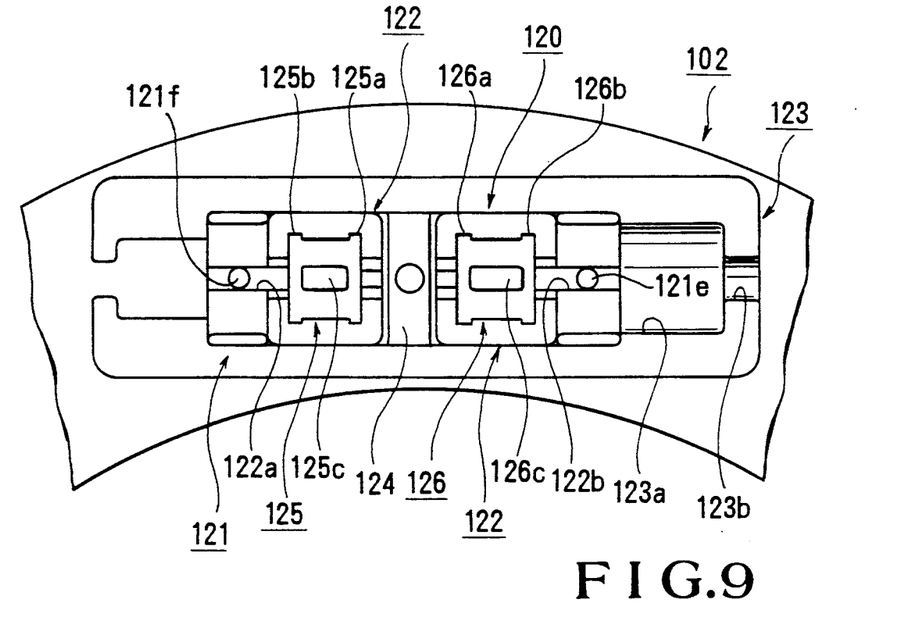
FIG. 9 is an enlarged sectional view showing a terminal housing unit in correspondence with FIG. 4.
Figure 10:
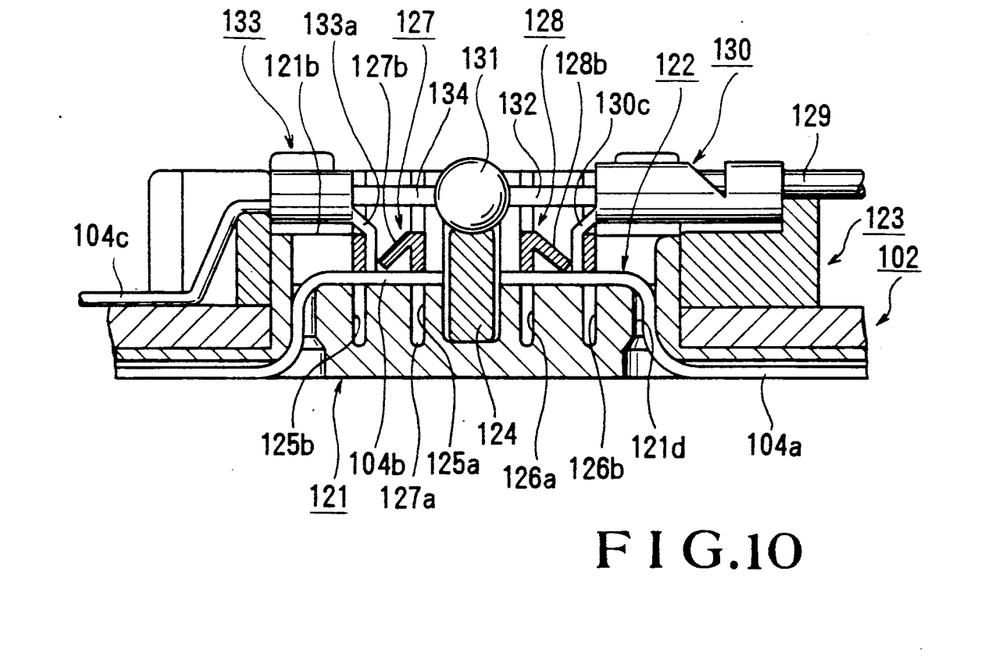
FIG. 10 is a cross-sectional view showing the terminal housing unit in correspondence with FIG. 6.

FIGS. 9 and 10 show still another embodiment of the present invention, in which FIG. 9 shows the section of a terminal housing unit in an enlarged scale in correspondence with FIG. 4 and FIG. 10 shows the cross section of the terminal housing unit in correspondence with FIG. 6. In this embodiment, terminal connection structures of an earth wire similar to the terminal connection structure of a power source lead wire used in the embodiments shown in FIGS. 1 to 6 are aligned in the circumferential direction in an annular groove of a yoke 102. Between the two terminal connection structures, a surge voltage absorbing diode 131 is fixed to support metal fittings 130 and 133 of the two structures and held in a terminal housing unit 120.

That is, one end 104a of an electromagnetic coil 104 extracted from an extraction hole 121d of a terminal press-fitting portion 121 is bent at a right angle and brought into contact with a flat surface of a projection 126c of a projecting portion 122 formed in a terminal housing unit 120 while being engaged with a groove 122b. The other end 104b of the electromagnetic coil 104 extracted from an extraction hole 121f is bent at a right angle and brought into contact with a flat surface of a projection 125c of a projecting portion 122 while being engaged with a groove 122a. When a mount metal fitting 127 inserted in a recess portion 125 of the projecting portion 122 is pushed to be engaged with a groove 125a of the projecting portion 122, the mount metal fitting 127 is press-fitted in the recess portion 125 while sandwiching the other end 104b of the electromagnetic coil 104 by a notched portion 127a and the flat surface of the projection 125c of the projecting portion 122. When a mount metal fitting 128 inserted in a recess portion 126 of the projecting portion 122 is pushed to be engaged with a groove 126a of the projecting portion 122, the mount metal fitting 128 is press-fitted in the recess portion 126 while sandwiching the other end 104a of the electromagnetic coil 104 by a notched portion 128a and the flat surface of the projection 126c of the projecting portion 122. The distal end portion of a lead wire 129 of a power source and a lead wire 132 of a diode 131 are integrally caulked by a support metal fitting 130, and the support metal fitting 130 is pushed to be engaged with a recess portion 123a and a groove 123b of a spacer 123. As a result, the support metal fitting 130 is press-fitted in a groove 126b while elastically deforming an elastic piece 128b of the mount metal fitting 128 by a bent piece 130c, and one end 104a of the electromagnetic coil 104 is strongly held in the projecting portion 122. When a support metal fitting 133 in which an earth wire 104c and a lead wire 134 of the diode 131 are integrally caulked is press-fitted on a support plate 121b and a bent piece 133a is press-fitted in a groove 125b of the recess portion 125 while elastically deforming an elastic piece 127b of the mount metal fitting 127 by a bent piece 133a, the other end 104b of the electromagnetic coil 104 is strongly held in the projecting portion 122. As a result, the diode 131 is moved together with the support metal fittings 130 and 133 and supported by a diode table 124. A terminal at the distal end portion of the earth wire 104c extracted from the electromagnetic coil 104 is fixed on the side surface of the yoke 102.

Although the support metal fittings 130 and 133 are arranged on opposite sides of the diode 131 in this embodiment, they may be aligned in the same direction. In this case, the lead wires 132 and 134 are bent at 90°.

As has been described above, according to the present invention, the support metal fitting to which the lead wire of the surge voltage absorbing member is connected and the mount metal fitting to which the two ends of the electromagnetic coil are connected are elastically coupled adjacent to each other. Therefore, an electromagnetic coupling device having high productivity can be provided at low cost.

What is claimed is:

1. A terminal connection structure of an electromagnetic coupling device, comprising:
    a terminal housing unit formed integrally with a resin coil bobbin having an electromagnetic coil therein, and projecting from a through hole formed in a yoke having an annular groove in which said resin coil bobbin is press-fitted;
    an extraction hole formed in said terminal housing unit to extract one end of a winding of said electromagnetic coil;
    a flat contact portion formed between a pair of grooves formed on two sides thereof in said terminal housing unit, one end of said winding extracted from said extraction hole being brought into contact with said flat contact portion;
    a conductive mount member press-fitted in one groove of said terminal housing unit to hold a portion of said winding brought into contact with said flat contact portion; and
    a conductive support member connected to a power source lead wire, said conductive support member being press-fitted in the other groove of said terminal housing unit to hold another portion of said winding brought into contact with said flat contact portion, and abutting against said mount member to hold press-fit states of both said conductive mount member and said conductive support member.

2. A structure according to claim 1, wherein said terminal housing unit includes a terminal press-fitting portion having a recess portion and said flat contact portion is constituted by a projecting portion formed in a central portion of said recess portion.

3. A structure according to claim 1, wherein said mount member has a substantially U-shaped notched portion in a lower half portion thereof, and said winding is held by said notched portion and said flat contact portion.

4. A structure according to claim 1, wherein said support member has a substantially U-shaped notched portion in a lower half portion thereof, and said winding is held by said notched portion and said flat contact portion.

5. A structure according to claim 1, wherein said mount member has an elastic piece, and said support member is press-fitted while elastically deforming said elastic piece.

6. A structure according to claim 5, wherein said mount member is formed of a metal plate having an inverted V-shaped section, one side of said inverted V-shaped metal plate being press-fitted in said terminal housing unit, and the other side serving as said elastic piece.

7. A structure according to claim 1, wherein said support member is integrally formed of caulking portions of a power source lead wire and a bent piece having a bent distal end, said bent piece being press-fitted in said terminal housing unit.

8. A structure according to claim 1, further comprising a rectangular frame-like spacer member formed on outer side surfaces of said through hole of said yoke so that an inner circumferential surface thereof is fitted on said terminal housing unit, said spacer member having engaging portions in which said support member is engaged to be positioned.

9. A structure according to claim 1, further comprising a resin cover for entirely covering said terminal housing unit and said spacer member, so that press-fit and engagement states of said support member are held by an engaging portion between said cover and said spacer member.

10. A structure according to claim 1, further comprising:
    a second extraction hole formed in said terminal housing unit to extract the other end of said winding of said electromagnetic coil;
    a second flat contact portion formed between a pair of grooves formed in two sides thereof in said terminal housing unit, the other end of said winding extracted from said second extraction hole being brought into contact with said second flat contact portion;
    a second conductive mount member press-fitted in one groove of said terminal housing portion to hold a portion of said winding brought into contact with said second flat contact portion; and
    a second conductive support member connected to an earth wire, said second conductive support member being press-fitted in the other groove of said terminal housing unit to hold another portion of said winding brought into contact with said second flat contact portion, and abutting against said second mount member to hold press-fit states of both said second conductive mount member and said second conductive support member.

11. A structure according to claim 10, wherein said two flat contact portions with which the two ends of said winding are brought into contact are aligned in the radial direction of said annular groove of said yoke.

12. A structure according to claim 10, wherein said two flat contact portions with which the two ends of said winding are brought into contact are aligned in the circumferential direction of said annular groove of said yoke.

13. A structure according to claim 10, further comprising a surge voltage absorbing member having two ends connected to said two support members for holding the two ends of said winding, said surge voltage absorbing member being housed in said terminal housing unit when the respective support members are press-fitted.

14. A structure according to claim 13, further comprising a support table for supporting said surge voltage absorbing member in said terminal housing unit.

* * * * *